United States Patent
Guziak

(10) Patent No.: US 6,567,921 B1
(45) Date of Patent: May 20, 2003

(54) ASYNCHRONOUS LOW POWER MODE BUS CONTROLLER CIRCUIT AND METHOD OF LOW POWER MODE OPERATION

(75) Inventor: James Edward Guziak, Laurys Station, PA (US)

(73) Assignee: Agere Systems, Inc., Allentown, PA (US)

(*) Notice: Subject to any disclaimer, the term of this patent is extended or adjusted under 35 U.S.C. 154(b) by 0 days.

(21) Appl. No.: 09/237,269

(22) Filed: Jan. 25, 1999

(51) Int. Cl.[7] ............................................. G06F 1/32
(52) U.S. Cl. ................................... 713/322; 713/601
(58) Field of Search ............................... 713/300–340, 713/600–601

(56) References Cited

U.S. PATENT DOCUMENTS

| | | | | |
|---|---|---|---|---|
| 5,630,145 A | * | 5/1997 | Chen | 713/322 |
| 5,675,813 A | * | 10/1997 | Holmdahl | 713/310 |
| 5,799,196 A | * | 8/1998 | Flannery | 713/320 |
| 5,848,281 A | * | 12/1998 | Smalley et al. | 713/322 |
| 6,085,325 A | * | 7/2000 | Jackson et al. | 365/222 |
| 6,272,644 B1 | * | 8/2001 | Urade et al. | 713/320 |

OTHER PUBLICATIONS

Universal Serial Bus Specification, Revision 1.0, pp. 1–9 and 217–268.*

* cited by examiner

Primary Examiner—Sumati Lefkowitz

(57) ABSTRACT

An asynchronous logic circuit allows a host Controller or hub to enter a low power state with its clock suspended. When a power manager calls for a low power state, the clock in the host or hub is suspended and the asynchronous logic circuit is engaged. The asynchronous logic circuit can detect events on the port while the host or hub is in the low power mode. The asynchronous logic circuit generates a downstream signal if required and sends out a wake up signal to the power manager. After the host or hub is awake, the host or hub regains control of the bus and the asynchronous logic circuit is disengaged.

12 Claims, 3 Drawing Sheets

FIG. 3

|  | D− (103) | |
|---|---|---|
| D+ (102) | 0 | 1 |
| 0 | SE0 (DISCONNECT) | IDLE RESUME OR CONNECT |
| 1 | IDLE RESUME OR CONNECT | NOT DEFINED |

USB DEVICE STATES

ASYNCHRONOUS LOW POWER MODE BUS CONTROLLER CIRCUIT AND METHOD OF LOW POWER MODE OPERATION

TECHNICAL FIELD

This invention relates to electronic circuits and more specifically to bus controllers.

BACKGROUND OF THE INVENTION

The Personal Computer (PC) industry is migrating towards power management architectures such as the Advanced Configuration and Power Interface described in the *Advanced Configuration and Power Interface Specification,* Revision 1.0 and dated Dec. 22, 1996, that specify low power requirements for the components in a PC. The *Advanced Configuration and Power Interface Specification* (ACPI Spec.) is incorporated herein by reference. Currently, peripheral bus controllers (for example, a Universal Serial Bus Host Controller) remain clocked (and therefore powered up) in order to meet their timing specifications. As a result, requirements for low power modes are not generally called for in bus controller specifications.

The Universal Serial Bus (USB) architecture has become the de facto standard in the PC industry for interfacing peripheral devices (for example, mouse, keyboard, printer, etc.) with a central processing unit (CPU) of a host computer. The requirements for the USB architecture are detailed in the *Universal Serial Bus Specification* (USB Spec) which is herein incorporated by reference. The USB Host Controller (Host) is the interface between a peripheral device and the host computer. USB Devices connect to the bus through a USB Port.

A USB Hub is a USB Device that provides additional port connections to the USB. A USB Hub is somewhat unique in that it allows responses to actions on a Port in accordance with the USB Spec. This generally requires that the USB Hub provide some of the same functionality as a USB Host.

Current implementations of the USB Host maintain the controlling clock signal active even when other USB devices are set in a low power state. The active clock signal causes the USB Host to continue to draw power during a low power state. The controlling clock signal is maintained in an active state because signals may be generated on the USB during the low power state. For example, disconnecting a USB device generates a Single Ended Zero (SE0) signal on the USB and connecting a device generates a CONNECT signal on the USB. In addition, activating one of the USB Devices (for example, pressing a keyboard button) generates an upstream (towards the host computer) RESUME signal on the USB. The USB Spec requires a fast response to a RESUME signal. For example, a downstream (away from the host computer) response to the receipt of a RESUME signal must be generated in less than fifty microseconds ($\mu s$) according to the current version of the USB Spec. An SE0 or CONNECT does not require a signal to be sent within this short time period to the USB Device but the system must be notified and the host computer made aware that a USB device has either been connected or disconnected. Signals from the USB device may then be processed normally.

As described above, a USB Host or Hub remains clocked so that it can receive and respond to either a RESUME, CONNECT, or SE0 signal from a USB Device within the time specified by the USB Spec. Typically, this means that the circuit continuously draws full power. In applications such as portable notebook and laptop computers, the ability to conserve power is critical in extending the duration the device can function on a battery supply or to lower total system power. As a result, the computer industry strives to reduce the power consumption of components when the computer is in a low power mode. It has been difficult, however, to place a USB Host or Hub in a low power mode and retain full USB functionality. A further problem is that transitions from an IDLE state to a RESUME state may be momentarily misinterpreted as an SE0 signal.

SUMMARY OF THE INVENTION

The present invention provides an asynchronous logic circuit that suspends the clock in a bus controller and places the device in low power mode. The asynchronous logic circuit functions as an event detector and responder not requiring clocks. While in low power mode, bus events can be detected and reported to the bus controller after wake up is complete. Additionally, the asynchronous logic circuit can respond to bus events until the bus controller is fully powered and ready to take over control.

BRIEF DESCRIPTION OF THE DRAWING

The invention will be more fully understood from the following detailed description taken in conjunction with the accompanying drawing in which:

FIG. 3 is a diagram of the signal states sent upstream from a USB Port.

DETAILED DESCRIPTION OF THE INVENTION

The present invention is described below with reference to FIG. 1, which is an illustrative embodiment of the present invention, implemented in the Universal Serial Bus architecture. Briefly, an asynchronous logic circuit is provided to allow a bus controller to enter a low power mode while retaining the ability to respond to bus events. In operation, the asynchronous logic circuit is notified that low power mode is requested (for example, a control signal sent or register bit set by power management hardware or software). The USB Host or Hub notifies active USB ports that they are suspended. The attached USB devices enter a low power mode in accordance with the USB Spec. The clock signal in the USB Host or Hub is then suspended and the USB Host or Hub is placed in a low power mode. The asynchronous logic circuit is then enabled and waits for a RESUME, CONNECT, or SE0 signal to appear on a USB Port.

Illustratively, if a RESUME signal is detected, the asynchronous logic circuit sends a downstream RESUME signal within fifty microseconds of detecting the RESUME signal on the USB Port in accordance with the USB Spec. This signal is maintained until the USB Host or Hub is ready to take over clocked operation. In either case, a wake up signal is sent to the power manager. Once the power manager has awakened the system and the USB Host or Hub is ready, control is passed back to the USB Host or Hub. The USB Host or Hub responds to the RESUME, CONNECT, or SE0 signal in a normal fashion and the asynchronous logic circuit is disabled from detecting these signals. This embodiment is described in greater detail below with reference to FIG. 1.

Figure 1:
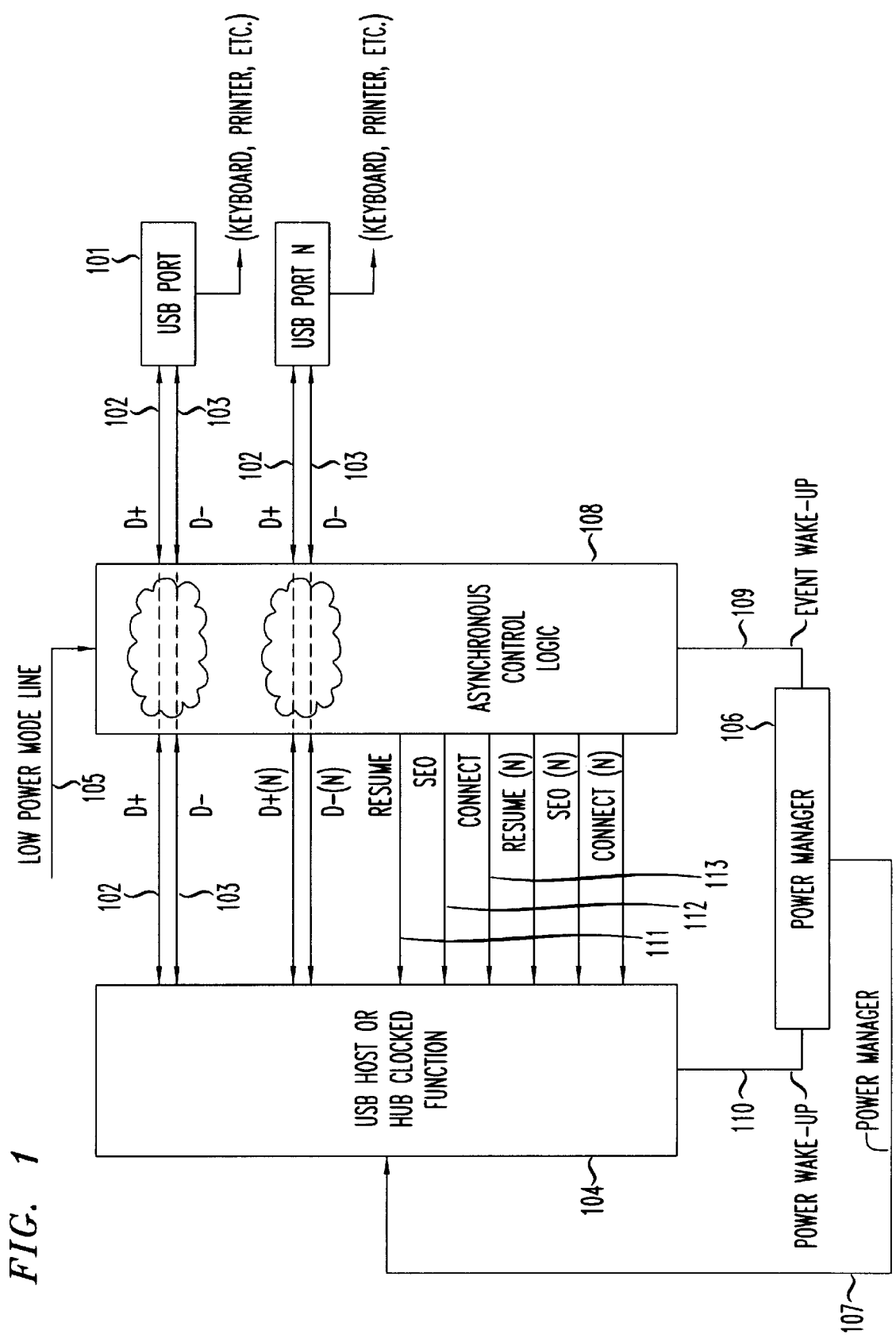
FIG. 1 is a schematic block diagram showing the interfaces among the USB Host or Hub, the asynchronous logic circuit, the USB Device and the Power Manager.

As is shown in FIG. 1, at least one USB Port 101, having signals D+ 102 and D– 103, is connected to asynchronous logic circuit 108. Multiple ports may be provided. The signals D+ 102 and D− 103 also connect to a typical clocked USB Host or Hub 104. This connection may either bypass the asynchronous logic circuit 108, or pass through it. Additionally, the asynchronous logic circuit 108 may detect when a low power mode has been indicated via low power line 105. This indication may comprise, for example, a separate signal or the setting of a specific register bit. Illustratively, the low power mode indication may originate from either the clocked USB Host or Hub 104 or from a power manager 106 that is incorporated with a host computer architecture. The power manager 106 is generally implemented in accordance with a defined specification (for example, ACPI).

More specifically, in this embodiment, while setting the system to a low power mode, the power manager 106 issues an indication that low power mode is initiated. For example, the power manager 106 may set a register bit or send a low power mode signal 107 to the USB Host or Hub 104 to enter low power mode. By stopping the clock in the USB Host or Hub 104 the power usage in that circuit is reduced. This is useful in extending battery life in portable computers. For example, the USB Host and Hub 104 in conjunction with the asynchronous logic circuit 108 could comply with the clocked or un-clocked ACPI Specification sleep states S1, S2, and S3 while not limiting any USB functionality and remaining fully USB compliant.

Figure 2:
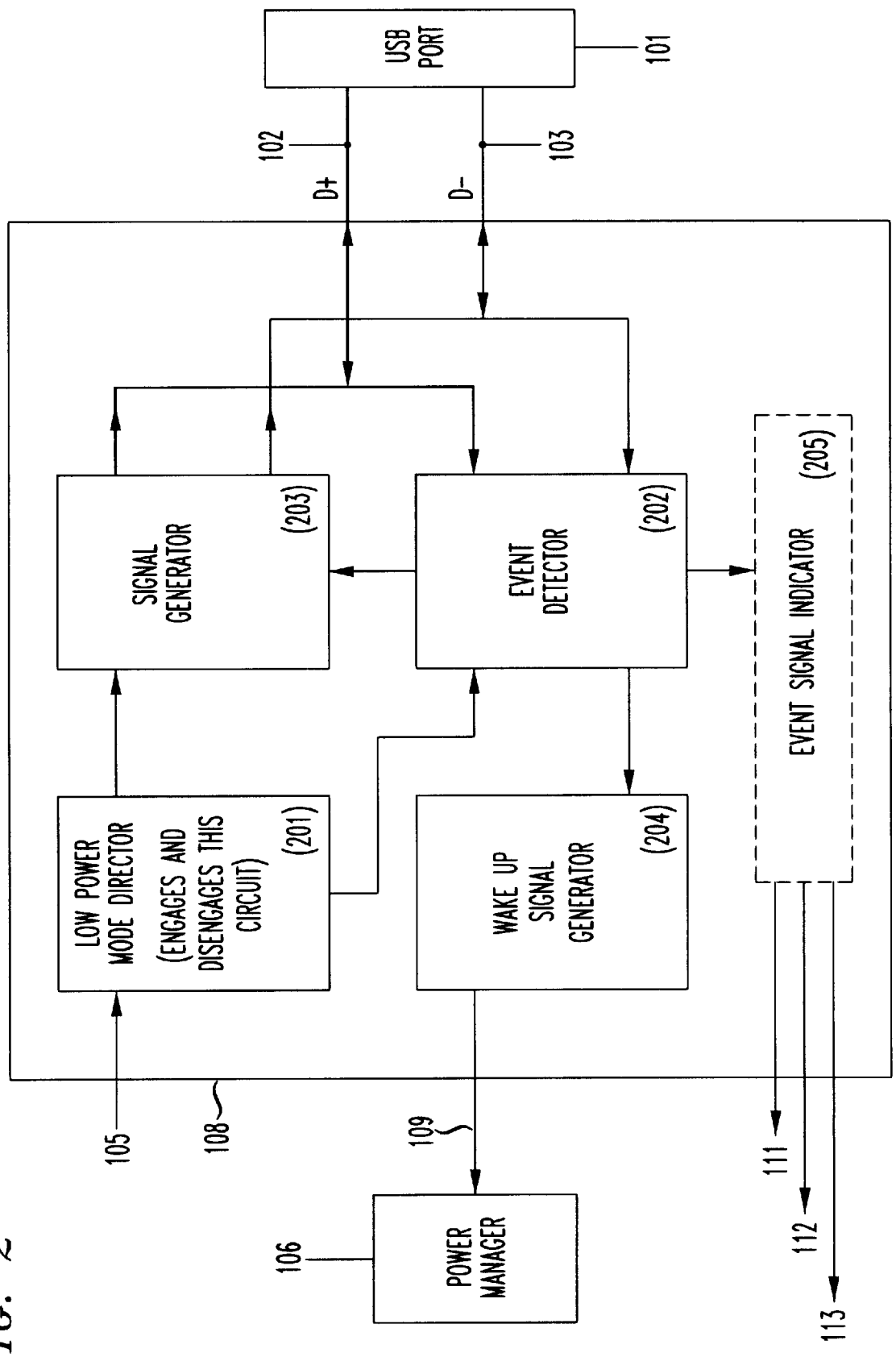
FIG. 2 is a functional diagram of the asynchronous logic circuit.

The asynchronous logic circuit is discussed in greater detail below with reference to FIG. 2 with continuing reference to FIG. 1. When the system has entered the low power mode, the low power mode director 201 activates the event detector 202 and the signal generator 203. The asynchronous logic circuit 108 monitors the USB Port 101 with the event detector 202 until the USB Host or Hub 104 of FIG. 1 is awake. This wake up results either from detecting a transition on USB Port 101 or from the power manager 106 issuing a wake up signal due to a non-bus related event.

Different USB device signaling states are shown in FIG. 3. A RESUME signal is indicated by logic level zero in the D+ signal 102 (or D− signal 103 for low speed) in conjunction with logic level one in the D− signal 103 (or D+ signal 102 for low speed) where the signals are maintained for at lease fifty microseconds ($\mu s$) but not more than 10 milliseconds (ms). Any timing information included herein reflects the current requirements of the USB Spec and is provided for illustrative purposes only. The circuitry may be implemented to comply with other like timing specifications.

An SE0 signal is indicated by logic level zero in the D+ signal 102 and logic level zero in the D− signal 103. A CONNECT signal is indicated by either: 1) a logic level one in the D+ signal 102 and a logic level zero in the D− signal 103 to indicate a full speed device connection, or 2) a logic level zero in the D+ signal 102 and a logic level one in the D− signal 103 to indicate a low speed device connection. The signals for SE0 and CONNECT must be maintained for a specified period of time. Illustratively, the USB spec requires that the signals be maintained for 2.5 $\mu s$. The determination of whether a signal is CONNECT or IDLE or whether it is CONNECT or RESUME will depend upon the previous value on the port. For example, a CONNECT state will be a transition from a previous SE0 on the USB Port 101 of FIG. 1.

During the transition from an IDLE state to a RESUME state, it is possible for a momentarily erroneous indication of an SE0 state to exist. This possibility exists in typical USB Host or Hub. This erroneous interpretation must be filtered out so that the USB Host or Hub 104 of FIG. 1 can determine which event woke up the system. The illustrative embodiment relies upon the inherent delay in waking up the clocked USB Host or Hub 104 for filtering out the erroneous interpretation. In other words, the time it takes for the USB Host or Hub 104 to begin responding to a clock signal and initialize will be longer than the duration of the false SE0 state. Illustratively, by the time the USB Host or Hub 104 is fully awake, the RESUME event (if that is what woke up the system), will be present and the momentary SE0 state will have been cleared. If a transition to the SE0 state caused the wake up, the state will persist after the USB Host or Hub 104 is fully awake and there will be no confusion as to which state woke up the system.

Any timing information included herein reflects the current requirements of the USB Spec. and is provided for illustrative purposes only. The asynchronous logic circuit 108 may be implemented to comply with other like timing specifications.

If a RESUME signal is detected by the asynchronous logic circuit 108 in accordance with the USB Spec, it will activate the signal generator 203 (FIG. 2) and generate a downstream RESUME signal (an acknowledgement signal) within fifty (50) $\mu s$. This downstream signal may persist for at least minimum of 20 ms and is continued until the USB HOST or Hub 104 starts transmission of the RESUME signal. This period of time provides the USB Host or Hub 104 of FIG. 1 with time to wake up. Once awake, the USB Host or Hub 104 determines whether the asynchronous logic circuit 108 is generating a RESUME signal. If a RESUME signal is being generated, the USB Host or Hub performs its normal function and generates the RESUME signal for a period of at least 20 ms to ensure compliance with the USB Spec. The asynchronous logic circuit 108 is also disabled at the same time.

Alternatively, the asynchronous logic circuit 108 may inform the USB Host or Hub 104 through separate signals 111, 112, 113 whether the wake up event was a RESUME, CONNECT, or SE0 on the aforementioned USB Port 101. An event signal indicator 205 as shown in FIG. 2 may generate these signals. The USB Host or Hub 104 (FIG. 1) would then use this information to determine what action to take after it has awakened.

The asynchronous logic circuit 108 also comprises a wake up signal generator 204 (FIG. 2) that generates a signal 109 to inform the power manager 106 that an event has occurred that requires the system to wake up. The power manager 106 then wakes up the system in accordance with the specifications under which it was implemented (for example, ACPI). Illustratively, the power manager 106 of FIG. 1 sends a power wake up signal 110 to the USB Host or Hub 104. The USB Host or Hub 104 either begins generating an internal clock signal or receives an external clock signal and initializes. Once the USB Host or Hub 104 has initialized, control is passed from the asynchronous logic circuit 108 to the USB Host or Hub 104 that begins functioning normally. In the case where a RESUME signal woke up the system, the USB Host or Hub 104 will ensure that the downstream RESUME signal is generated for a period of at least twenty (20) ms, in compliance with the USB Spec. If an SE0 or CONNECT wake up the system, the USB Host will perform the actions required by the USB Spec. Once the USB Host or Hub 104 assumes control, the low power mode director 201 of FIG. 2 disables the asynchronous logic circuit 108. The system now functions in its normal clocked configuration.

Finally, it is to be understood that although the invention is disclosed herein in the context of a particular illustrative embodiment, those skilled in the art will be able to adapt it in numerous alternative embodiments. In particular, this invention may be applied to any bus controller to allow it to respond to events on the bus and wake up the controller from a low power mode (for example, Fire Wire—IEEE standard 1394).

I claim:

1. A bus controller comprising:

a Universal Serial Bus port;

an asynchronous logic circuit coupled to the Universal Serial Bus port; and a clock circuit;

wherein the asynchronous logic circuit is adapted to detect an event at the Universal Serial Bus port, cause the clock circuit to change from a sleeping state to a wake state, and transmit an acknowledgment signal until the clock circuit has entered the wake state.

2. The bus controller of claim 1 further comprising a clocked bus controller wherein the logic circuit is further adapted to cause the clocked bus controller to change from a sleeping state to a wake state.

3. The bus controller of claim 2 wherein the acknowledgment signal is transmitted until the clocked bus controller has entered the wake state.

4. The bus controller of claim 1 wherein the acknowledgement signal is transmitted, within the time specified by the USB specification, until the clock circuit has entered the wake state.

5. The bus controller of claim 4 wherein the acknowledgement signal is a downstream RESUME signal.

6. The bus controller of claim 1 further comprising:

a power management circuit adapted to, when a low power mode is indicated, to cause the clock circuit to enter a sleep state and to enable the logic circuit.

7. A computer including a bus controller and a bus, the bus controller comprising:

an asynchronous logic circuit; and a clock circuit;

wherein the asynchronous logic circuit is adapted to detect an event on the bus, cause the clock circuit to change from a sleeping state to a wake state, and transmit an acknowledgment signal until the clock circuit has entered the wake state.

8. The computer of claim 7 further comprising:

a power management circuit adapted to, when a low power mode is indicated, cause the clock circuit to enter a sleep state and to enable the logic circuit.

9. A clocked bus controller comprising:

a power manager; and an asynchronous logic circuit;

the power manager adapted to:
  recognize that a low power mode is indicated,
  enable, upon recognition of the low power mode, the asynchronous logic circuit, and
  suspend, upon recognition of the low power mode, a clock signal in the clocked bus controller;

the asynchronous logic circuit adapted to:
  detect activity on a bus port,
  produce, upon detection of activity, an acknowledgment signal upon detecting activity until the clocked bus controller is enabled,
  enable, upon detection of activity, the clock signal in the clocked bus controller.

10. A method of using an asynchronous logic circuit for detecting and responding to bus events for use with a clocked bus controller capable of low power mode, the method comprising:

(a) detecting activity on a bus port;

(b) responding, upon detecting activity, until the clocked bus controller is ready;

(c) sending a wake up signal to a power manager; and (d) passing control from the asynchronous logic circuit to the clocked bus controller once the clocked bus controller is ready and low power mode is no longer indicated.

11. The method of claim 10 further comprising:

(f) recognizing that low power mode is indicated;

(g) enabling the asynchronous logic circuit; and (h) suspending a clock signal in the clocked bus controller.

12. The method of claim 11 wherein steps (f) through (h) occur prior to steps (a) through (e).

* * * * *